United States Patent
Dahlstedt

(10) Patent No.: US 8,959,512 B2
(45) Date of Patent: *Feb. 17, 2015

(54) SYSTEM AND METHOD TO IMPROVE MEMORY USAGE IN VIRTUAL MACHINES RUNNING AS HYPERVISOR GUESTS

(75) Inventor: Joakim Dahlstedt, Stockholm (SE)

(73) Assignee: Oracle International Corporation, Redwood Shores, CA (US)

( * ) Notice: Subject to any disclaimer, the term of this patent is extended or adjusted under 35 U.S.C. 154(b) by 392 days.

This patent is subject to a terminal disclaimer.

(21) Appl. No.: 13/432,266

(22) Filed: Mar. 28, 2012

(65) Prior Publication Data

US 2012/0185854 A1     Jul. 19, 2012

Related U.S. Application Data

(63) Continuation of application No. 12/205,467, filed on Sep. 5, 2008, now Pat. No. 8,156,492.

(60) Provisional application No. 60/970,834, filed on Sep. 7, 2007.

(51) Int. Cl.
    G06F 9/455    (2006.01)
    G06F 9/50     (2006.01)
    G06F 12/02    (2006.01)

(52) U.S. Cl.
    CPC .......... *G06F 9/5016* (2013.01); *G06F 12/0253* (2013.01); *G06F 2212/1044* (2013.01)
    USPC ................................ 718/1; 719/312; 719/321

(58) Field of Classification Search
    CPC . G06F 9/45533; G06F 9/507; G06F 9/45537; G06F 12/0253; G06F 12/0269; G06F 12/0261; G06F 12/0276
    See application file for complete search history.

(56) References Cited

U.S. PATENT DOCUMENTS

| | | | |
|---|---|---|---|
| 6,286,016 B1 * | 9/2001 | Heller et al. | 1/1 |
| 6,760,815 B1 | 7/2004 | Traversat et al. | |
| 6,763,440 B1 | 7/2004 | Traversat et al. | |
| 6,854,115 B1 | 2/2005 | Traversat et al. | |
| 6,971,097 B1 * | 11/2005 | Wallman | 718/101 |

(Continued)

FOREIGN PATENT DOCUMENTS

WO    01/97029    6/2001

OTHER PUBLICATIONS

PCT International Preliminary Report on Patentability dated Mar. 18, 2010 in re PCT Application No. PCT/US2008/075616, 7 pages.

(Continued)

*Primary Examiner* — Van Nguyen
(74) *Attorney, Agent, or Firm* — Meyer IP Law Group

(57) ABSTRACT

A system and method to improve memory usage in virtual machines running as hypervisor guests. In accordance with an embodiment, the invention provides a system for changing the memory usage of a virtual machine on request from a hypervisor, comprising: a hypervisor; a guest operating system executing inside the hypervisor; a communication channel between the hypervisor and the guest operating system; a balloon driver in the guest operating system; a virtual machine for executing a software application; a communication channel between the balloon driver and the virtual machine; a memory space or heap for use by the virtual machine in storing software objects and pointers as part of the software application; and a compacting garbage collector for use by the virtual machine.

20 Claims, 5 Drawing Sheets

(56) References Cited

U.S. PATENT DOCUMENTS

| | | | |
|---|---|---|---|
| 7,089,273 | B2 | 8/2006 | Wu et al. |
| 7,174,354 | B2 | 2/2007 | Andreasson |
| 7,197,521 | B2 | 3/2007 | Subramoney et al. |
| 7,302,515 | B1 | 11/2007 | Detlefs |
| 7,340,493 | B2 | 3/2008 | Lake |
| 7,433,951 | B1 | 10/2008 | Waldspurger |
| 7,788,461 | B2 | 8/2010 | Rawson, III |
| 7,925,850 | B1 | 4/2011 | Waldspurger et al. |
| 8,032,897 | B2 | 10/2011 | Serebrin |
| 8,156,492 | B2 * | 4/2012 | Dahlstedt ............ 718/1 |
| 2007/0016633 | A1 | 1/2007 | Lindholm et al. |

OTHER PUBLICATIONS

PCT International Search Report dated Dec. 19, 2008 in re PCT Application No. PCT/US2008/075616, 16 pages.

Waldspurger, Memory Resource Management in VM Ware ESX Server, USENIX Association, 5th Symposium on Operating Systems Design and Implementation, pp. 181-194, Jan. 1, 2002.

The Role of Memory in VM Ware EXS Server 3, 10 pages, Sep. 2006.

Sundarrajan et al., Nova: An Approach to On-Demand Virtual Execution Environment for Grids, Sixth IEEE International Symposium on Cluster Computing and the Grid, 4 pages, 2006.

Grzegorczyk et al., Isla Vista Heap Sizing: Using Feedback to Avoid Paging, International Symposium on Code Generation and Optimization, 13 pages, 2007.

Barham et al., Xen and the Art of Virtualization, Proceeding of the ACM Symposium on Operating System Principles, ACM, SOSP '03, 14 pages, Oct. 19-22, 2003.

Lu, Virtual Machine Memory Access Tracing With Hypervisor Exclusive Cache, USENIX Annual Technical Conference, 15 pages, Jun. 2007.

BEA Systems, Adaptive Memory Management for Virtualized Java Environment, 11 pages, Mar. 2008.

* cited by examiner

SYSTEM AND METHOD TO IMPROVE MEMORY USAGE IN VIRTUAL MACHINES RUNNING AS HYPERVISOR GUESTS

CLAIM OF PRIORITY

This application is a continuation of U.S. patent application titled "SYSTEM AND METHOD TO IMPROVE MEMORY USAGE IN VIRTUAL MACHINES RUNNING AS HYPERVISOR GUESTS", application Ser. No. 12/205,467, filed Sep. 5, 2008, now U.S. Pat. No. 8,156,492, issued on Apr. 10, 2012; which claims the benefit of priority to U.S. Provisional Patent Application titled "SYSTEM AND METHOD TO IMPROVE MEMORY USAGE IN VIRTUAL MACHINES RUNNING AS HYPERVISOR GUESTS", Application No. 60/970,834, filed Sep. 7, 2007; each of which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to virtual machine environments and other run-time environments, and in particular to memory usage within Java and other virtual machine environments running as guests within a hypervisor.

BACKGROUND

Server virtualization can be used to partition a single physical server into several virtual servers, wherein each virtual server can run its own operating system (OS) and set of applications. The software responsible for managing the virtual servers is generally referred to as a hypervisor. A system administrator can configure the hypervisor to give each virtual server its own share of the physical resources, such as RAM or CPU time. In this manner multiple copies of an operating system think they are each running on their own server, when in reality they are sharing one physical server. An operating system running within a hypervisor is generally referred to as a guest to the hypervisor.

One of the primary uses for virtualization technology is to improve server utilization. A server application running alone on a server seldom makes full use of the server. For example, if two applications that each use 40% of a server capacity could be run on the same server, then only one physical server would be needed instead of two physical servers, with a corresponding reduction of energy consumption and space requirements.

Server virtualization is not needed to aggregate several applications on the same server, so long as the applications all require the same operating system and libraries. Unfortunately, many legacy server applications require different operating systems, or different versions thereof. In these instances the only way to run several of these legacy server applications on the same server is to use a hypervisor to perform server virtualization. In some instances the hypervisor can also provide services that are not normally available in operating systems, such as guaranteeing that a certain amount of the server resources are available to one guest, but not to another less privileged guest. With several physical servers, each running a hypervisor, the hypervisor on one server can move a guest to another server. This can be used to accommodate changes in application workload or necessary upgrades or repairs of servers. Examples of server virtualization technology currently available include VMWare and XenSource.

Since an idling server often uses almost as much energy as a working server (in contrast to, for example, laptops which try to save energy due to battery considerations) aggregating guests can provide substantial energy and space savings, which immediately translates into lower costs. Therefore a common project in many information technology or IT departments is data center consolidation. Data center consolidation is also driven by necessity, for example it is often not possible to add more power to the computer center or there is no more available server space. However in the long term perspective putting old applications and operating systems onto modern hardware using hypervisors is probably not an efficient solution. More intelligent applications that cooperate with the underlying operating system and the hypervisor are needed to fully exploit the data center resources in the future.

In contrast to virtual servers which emulate an already existing hardware design, virtual machines are abstract computers for which application software can be compiled. The virtual machine is thus an abstraction level for application software that is consistent between different hardware and operating system combinations. Most of the complexity in running the same application on different platforms is handled by the virtual machine, and therefore the virtual machine becomes a very complex piece of software. Modern virtual machines need to manage code generation for the particular processor, operating system dependent resources such as threads, networking and file system. The virtual machine also manages the heap, within which allocation and freeing of virtual machine objects is performed. Examples of virtual machines include the Java Virtual Machine (JVM) and implementations thereof, including the JRockit JVM, and the Hotspot JVM. A large portion of today's server applications are written in Java and are executed on such virtual machines. The current trend with data center consolidation requires virtual machines to behave well when run as hypervisor guests, and contribute to the resource savings effort.

SUMMARY

Disclosed herein is a system and method to improve memory usage in virtual machines, or other garbage collected runtime environments, running as hypervisor guests. Current techniques for hypervisor control of guest operating systems severely affect the performance of a virtual machine running inside the guest operating system.

An embodiment of the present invention addresses this problem by providing a system and method to improve memory usage in virtual machines, or other garbage collected runtime environments, running as hypervisor guests. In accordance with an embodiment, a system is provided for changing the memory usage of a virtual machine on request from a hypervisor, comprising: a hypervisor; a guest operating system executing inside the hypervisor; a communication channel between the hypervisor and the guest operating system; a balloon driver in the guest operating system; a virtual machine for executing a software application; a communication channel between the balloon driver and the virtual machine; a memory space or heap for use by the virtual machine in storing software objects and pointers as part of the software application; and a compacting garbage collector for use by the virtual machine.

In accordance with another embodiment, the balloon driver can control the heap size of the virtual machine using the balloon driver to virtual machine communication channel.

In accordance with another embodiment, the hypervisor can divide available physical RAM evenly or in a specified proportion between the virtual machine heaps.

In accordance with another embodiment, the hypervisor can set different heap sizes for different virtual machines to guarantee conformance to service level contracts which are different for each virtual machine.

In accordance with another embodiment, the operating system can be specifically tailored to run only a single virtual machine with no swapping and no other user processes.

DETAILED DESCRIPTION

Figure 1:
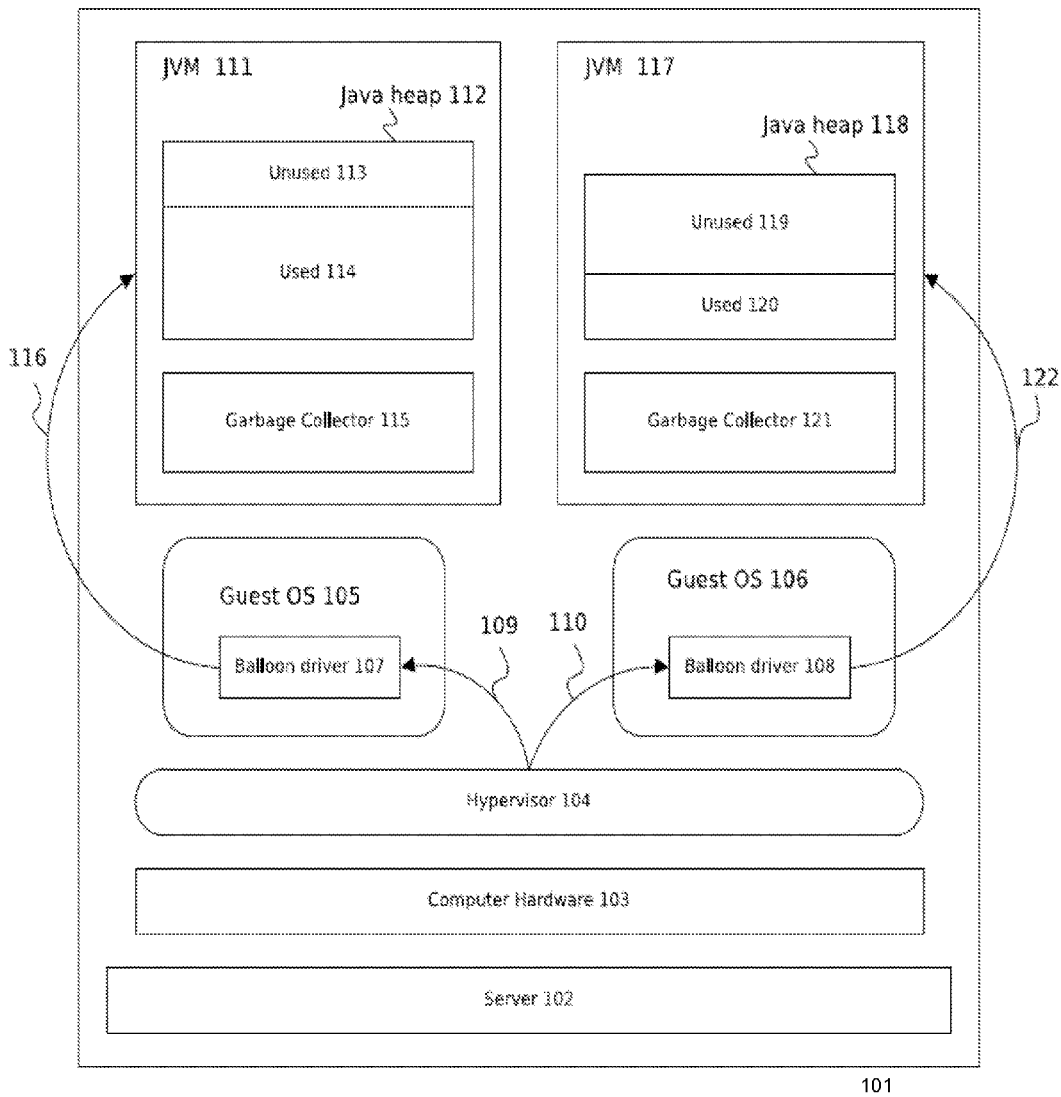
FIG. 1 shows an illustration of a system in accordance with an embodiment that improves memory usage of virtual machines running as guests within a hypervisor.

Server virtualization can be used to partition a single physical server into several virtual servers, wherein each virtual server can run its own operating system (OS) and set of applications. The software responsible for managing the virtual servers is generally referred to as a hypervisor. A system administrator can configure the hypervisor to give each virtual server its own share of the physical resources, such as RAM or CPU time. In this manner multiple copies of an operating system think they are each running on their own server, when in reality they are sharing one physical server. An operating system running within a hypervisor is generally referred to as a guest to the hypervisor.

One of the primary uses for virtualization technology is to improve server utilization. A server application running alone on a server seldom makes full use of the server. For example, if two applications that each use 40% of a server capacity could be run on the same server, then only one physical server would be needed instead of two physical servers, with a corresponding reduction of energy consumption and space requirements.

Server virtualization is not needed to aggregate several applications on the same server, so long as the applications all require the same operating system and libraries. Unfortunately, many legacy server applications require different operating systems, or different versions thereof. In these instances the only way to run several of these legacy server applications on the same server is to use a hypervisor to perform server virtualization. In some instances the hypervisor can also provide services that are not normally available in operating systems, such as guaranteeing that a certain amount of the server resources are available to one guest, but not to another less privileged guest. With several physical servers, each running a hypervisor, the hypervisor on one server can move a guest to another server. This can be used to accommodate changes in application workload or necessary upgrades or repairs of servers. Examples of server virtualization technology currently available include VMWare and XenSource.

Since an idling server often uses almost as much energy as a working server (in contrast to, for example, laptops which try to save energy due to battery considerations) aggregating guests can provide substantial energy and space savings, which immediately translates into lower costs. Therefore a common project in many information technology or IT departments is data center consolidation. Data center consolidation is also driven by necessity, for example it is often not possible to add more power to the computer center or there is no more available server space. However in the long term perspective putting old applications and operating systems onto modern hardware using hypervisors is probably not an efficient solution. More intelligent applications that cooperate with the underlying operating system and the hypervisor are needed to fully exploit the data center resources in the future.

In contrast to virtual servers which emulate an already existing hardware design, virtual machines are abstract computers for which application software can be compiled. The virtual machine is thus an abstraction level for application software that is consistent between different hardware and operating system combinations. Most of the complexity in running the same application on different platforms is handled by the virtual machine, and therefore the virtual machine becomes a very complex piece of software. Modern virtual machines need to manage code generation for the particular processor, operating system dependent resources such as threads, networking and file system. The virtual machine also manages the heap, within which allocation and freeing of virtual machine objects is performed. Examples of virtual machines include the Java Virtual Machine (JVM) and implementations thereof, including the JRockit JVM, and the Hotspot JVM. A large portion of today's server applications are written in Java and are executed on such virtual machines. The current trend with data center consolidation requires virtual machines to behave well when run as hypervisor guests, and contribute to the resource savings effort.

Java Virtual Machine Memory Usage

A Java program works on data structures referred to as Java objects, which in turn are stored in the Java heap. The Java heap is an area of the available memory that is reserved for Java objects only. New objects are created in the Java heap, and when there is no more space left in the heap, a garbage collection process is used to identify objects that are no longer in use and the corresponding memory can then be reclaimed and used for new Java objects. The definition of the Java Virtual Machine does not specify any requirements on the performance or the behavior of the garbage collection process other than basic assumptions such as: unused memory should be reused for new objects, and finalizers should be called when objects are to be released. Additional information about the Java Virtual Machine is provided in "The Java Virtual Machine Specification (2nd Edition), 1999", by Tim Lindholm and Frank Yellin, incorporated herein by reference. The JVM implementer can therefore choose to optimize different kinds of behaviors, depending on the requirements of the application software and the features of the particular hardware used. A perfect garbage collector would be undetectable to the application software and the software user, in that there would be no pauses, no extra CPU or memory consumption.

Unfortunately no such garbage collector exists, and a lot of work has been invested into achieving high performance object allocation and garbage collection with different algorithms for different goals.

In general, a larger Java heap provides better performance because it will take a longer time to fill up the available memory, and there will therefore be fewer garbage collections. The JVM can continue to function as long as the Java heap is slightly larger than the application size. The application size is also referred to as the live data size, and is simply the sum of all objects known to be live after a garbage collection. The application size cannot exceed the maximum size of the Java heap. If the application tries to exceed this limit then a fatal out-of-memory error is thrown and the JVM terminates.

With an application size that is almost the same as the Java heap size the JVM will spend most of its time garbage collecting, and the application performance will be very low. If the Java heap is twice the application size then the performance impact of garbage collection is usually reasonable or even low.

Operating System Memory Usage

Swapping is a proven operating system technique to allow allocation of more RAM than a server physically has available. The general idea of swapping is that if one process does not currently access an area of its RAM, then the operating system can instead store the contents of that area on disk, and give the memory to another process that needs memory more urgently. If the original process later tries to access that area of memory again, the operating system has to load it from disk into memory again. (If the operating system is out of memory when the request happens, it may have to first swap out some other memory to disk to complete the request). In theory and practice, swapping works well in a multi-process operating environment for many types of processes. Hardware and operating system software have been designed and optimized for a long period of time to perform swapping efficiently, and applications often have code and data that are more seldom used than other parts of the same application.

Efficient swapping relies on the existence of areas of memory that are currently not actively used and that will not be accessed soon. These areas of memory may contain important data, wherein that data is currently not accessed, but in some distant future may get accessed. Successful swapping relies on the system's ability to find these inactive memory areas. They stand in sharp contrast to the active memory areas, as these are frequently accessed by the process. If most of the memory areas are active, then the system will be unable to find sufficient number of inactive areas to swap out, and will have to swap out some active areas. This swapping will result in severe performance degradation, since pages have to be stored to disk and immediately brought back in RAM.

Hypervisor Swapping of Virtual Machine Memory

A hypervisor can decide to swap out pieces of a virtual machine, in the same way as an operating system can decide to swap out pieces of processes, to provide room for other virtual machines that have more need for memory. Moreover, in the same way that operating system swapping is transparent to a process inside the operating system, hypervisor swapping is transparent to an operating system inside a virtual machine. The swapping process is transparent to the guest operating system, apart from that the operating system may detect that it sometimes runs slower. The operating system itself cannot detect that parts of it are swapped out. Since the whole operating system runs slower, the processes inside the operating system will also run slower.

The reason for the hypervisor to swap out pieces of a virtual machine's memory is generally the same as for the operating system to swap out pieces of a process's virtual memory, i.e., there is a fixed amount of physical RAM and the hypervisor tries to share these resources between the guests in the most efficient way.

Successful, efficient swapping is highly dependent on which pages (pieces of memory) are picked to get swapped out. Ideally, the pages that will be used furthest into the future should be selected. Such an algorithm would be difficult to design, but fairly good approximations exist for operating system swapping. For hypervisors the problem is more complicated. If the hypervisor used the same swapping algorithm as the guest operating system then the hypervisor and the guest operating system would want swap the same pages. If the hypervisor swaps the page out first, then it would be likely that sometime soon afterwards the guest operating system inside the virtual machine would decide to swap out the same page. The operating system swap would force the hypervisor to load the page again for the operating system to access so that it can be swapped out again. Clearly, this is not a good idea.

It is better if the guest operating system tries to swap first, and when the operating system has finished swapping out pages, the hypervisor can swap out more if it needs to. This can be accomplished if the hypervisor can trigger the operating system to perform swapping. Legacy operating systems normally have no functionality to receive commands from external software on how they should manage the RAM. Some hypervisors address this problem by inserting a device driver inside the guest operating system that can communicate with the hypervisor. The hypervisor uses a hypervisor to operating system communication channel and tells the driver that it wants the operating system to swap. The driver then allocates non-swappable memory in the operating system. The effect is that the operating system has to swap out other memory. The hypervisor can detect the memory allocated by the driver and avoid allocating RAM for it, thus reducing the total amount of RAM used by the guest operating system.

This type of driver is sometimes referred to as a balloon driver, since the memory allocated by the driver can be seen as a balloon expanding inside the guest operating system and pushing out the processes to swap space. The end result is better performance since the operating system is better suited than the hypervisor to select the best pages to swap to disk.

Unfortunately, a virtual machine such as the JVM with a large garbage-collected heap is very sensitive to swapping. As described above, swapping improves memory usage and has little performance impact as long as the memory usage frequency is non-uniform, i.e. some parts of memory are used more often that other parts. Since the Java heap is fully used before a garbage collection is triggered, the live Java objects are often spread out uniformly over the Java heap. Thus when the garbage collection is performed and the live objects are traced and found, reads must be performed randomly over the whole Java heap during the short period when the garbage collector is active. If the whole heap cannot be kept in memory, (i.e. some parts always have to be swapped out), then the garbage collection trace, which examines in random order most of the Java heap, will cause the garbage collection to slow down, perhaps to an almost complete standstill.

A hypervisor using a balloon driver can therefore not tune the memory usage of a guest operating system running a JVM without severely affecting the performance of the JVM. This is a serious drawback that reduces the efficiency of any garbage-collected virtual machine running in a virtual server environment. Any new technique to improve the memory usage of garbage-collected virtual machines running as guests within a hypervisor would increase the savings generated by server virtualization.

Improved Memory Usage in Virtual Machines Running as Hypervisor Guests

Disclosed herein is a system and method to improve memory usage in virtual machines, or other garbage collected runtime environments, running as hypervisor guests. As described above, current techniques for hypervisor control of guest operating systems severely affect the performance of a virtual machine running inside the guest operating system. An embodiment of the present invention addresses this problem by providing a system and method to improve memory usage in virtual machines, or other garbage collected runtime environments, running as hypervisor guests. An embodiment addresses this problem by providing a system and method to improve memory usage in virtual machines, or other garbage collected runtime environments, running as hypervisor guests. In accordance with an embodiment, the system provides for changing the memory usage of a virtual machine on request from a hypervisor, comprising: a hypervisor; a guest operating system executing inside the hypervisor; a communication channel between the hypervisor and the guest operating system; a balloon driver in the guest operating system; a virtual machine for executing a software application; a communication channel between the balloon driver and the virtual machine; a memory space or heap for use by the virtual machine in storing software objects and pointers as part of the software application; and a compacting garbage collector for use by the virtual machine.

FIG. 1 shows an illustration of a system in accordance with an embodiment that improves memory usage of virtual machines running as guests within a hypervisor. As shown in FIG. 1, the system 101 comprises a server 102 that further comprises a computer hardware 103. The computer hardware is running a hypervisor 104. The hypervisor is running two guest operating systems 105 and 106. Each operating system contains a balloon driver 107 and 108 respectively. The hypervisor controls the memory usage of the guest operating systems using channels 109 and 110 respectively.

In accordance with an embodiment, a first Java Virtual Machine 111 runs as a process within the guest operating system 105. When the application software is running it makes use of the Java heap 112, which contains unused free memory 113 and used memory containing live Java objects 114. The heap is garbage collected by a compacting garbage collector 115. A compacting garbage collector selects an area of the Java heap at each garbage collection, and moves the selected Java objects close to each other, to create large areas of unused memory. The balloon driver 107 controls the memory usage of the JVM 111 using the channel 116.

In accordance with an embodiment, the second guest operating system 106 with its JVM 117 has a smaller Java heap 118 with more unused space 119, and less live data 120. It also has a compacting garbage collector 121. The memory usage operating system JVM 117 is controlled by the balloon driver 108 using the channel 122.

Figure 2:
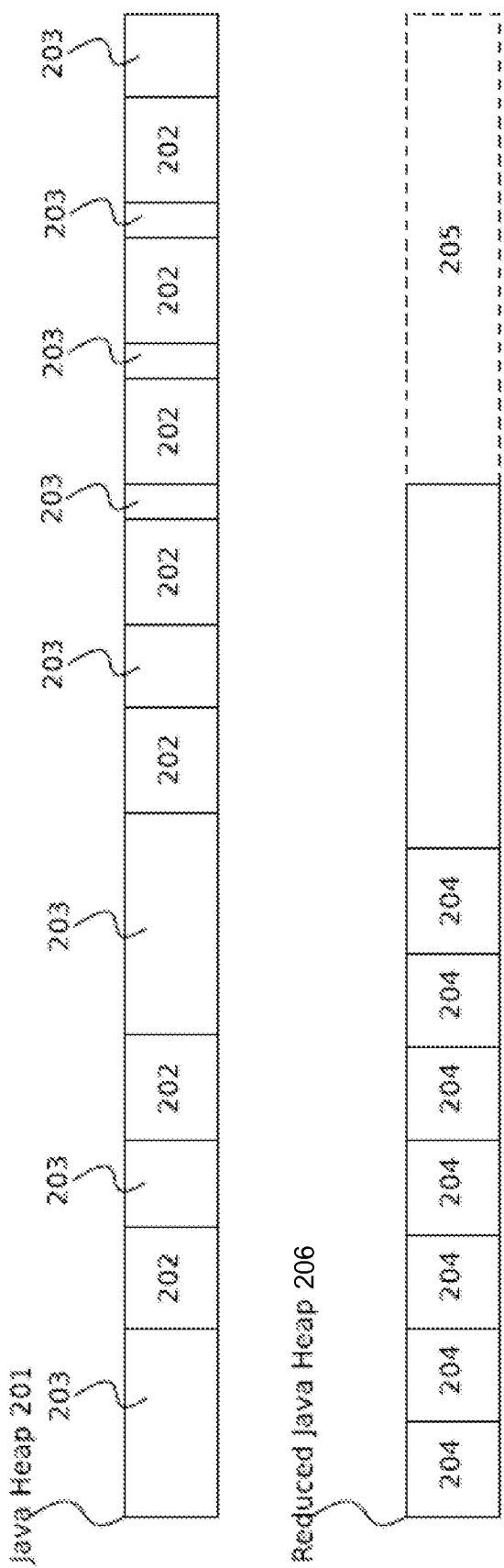
FIG. 2 shows a schematic of the memory layout in accordance with an embodiment, illustrating the Java heap before and after the heap size has been reduced.

FIG. 2 shows a schematic of the memory layout in accordance with an embodiment, illustrating the Java heap before and after the heap size has been reduced. As shown in FIG. 2, the Java heap 201 contains several Java objects 202 that are randomly spread out over the heap. In accordance with an embodiment, the Java heap is reduced so that the reduced Java heap 206 contains the same Java objects 204, but the objects are instead all moved closer to each other, i.e. they are compacted. This makes possible to remove the end 205 of the Java heap.

Figure 3:
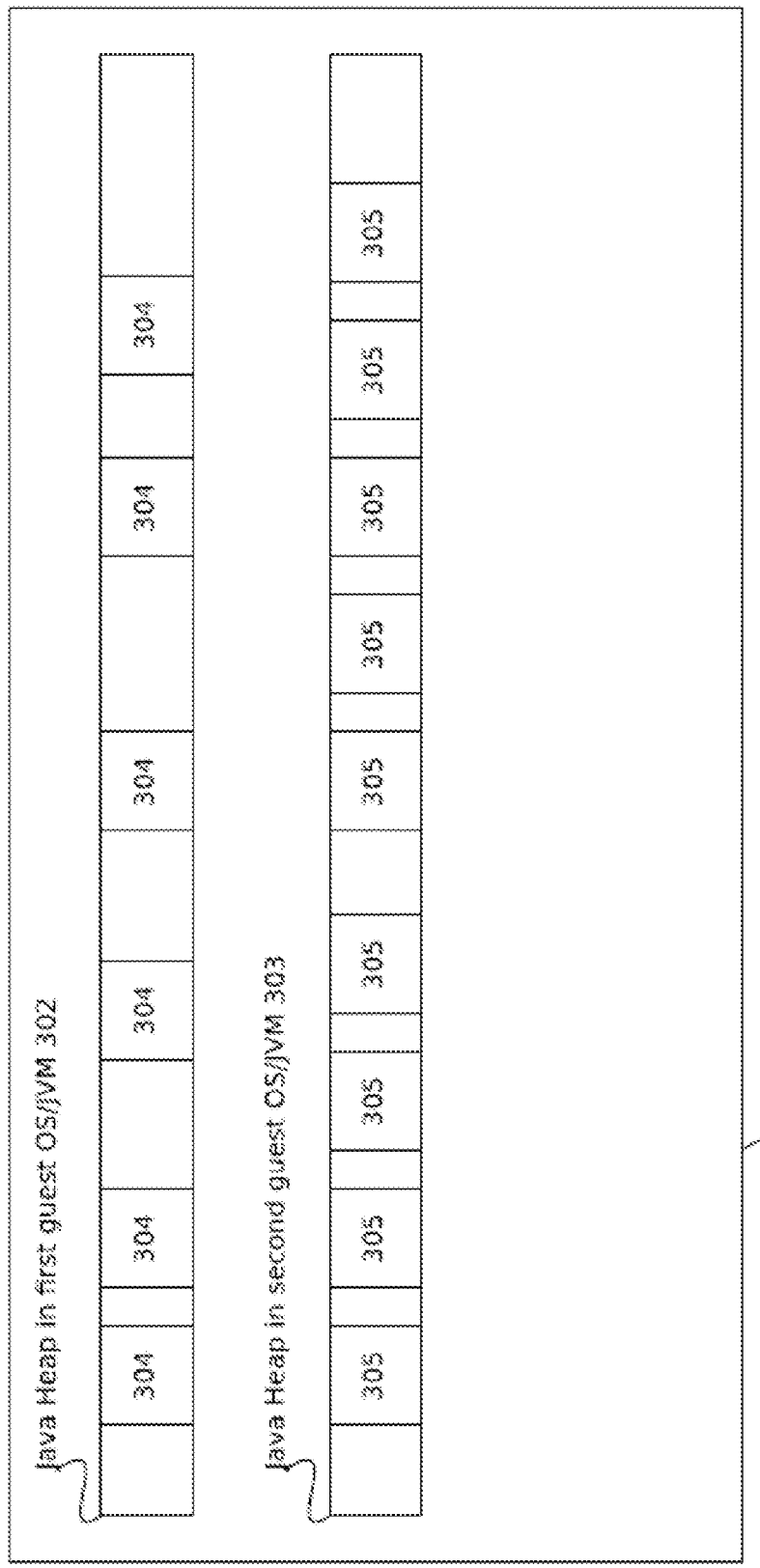
FIG. 3 shows a schematic of the memory layout in accordance with an embodiment, illustrating when two OS/JVM guests are running within a hypervisor.

FIG. 3 shows a schematic of the memory layout in accordance with an embodiment, illustrating when two OS/JVM guests are running within a hypervisor. As shown in FIG. 3, the hypervisor RAM 301 is being used for two guest OS/JVMs, with Java heaps 302 and 303. The Java heaps also contain Java objects 304 and 305 respectively.

Figure 4:
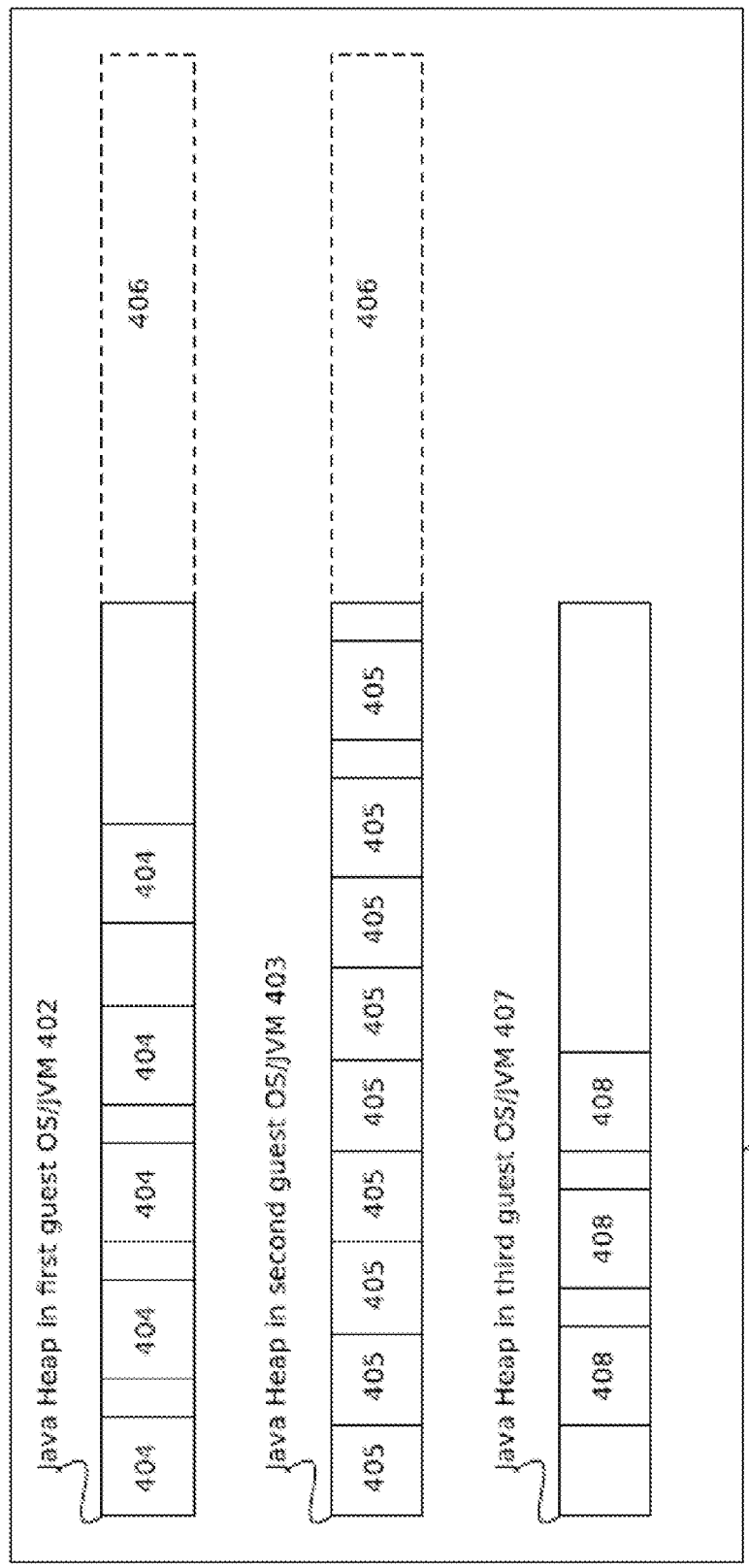
FIG. 4 shows a schematic of the memory layout in accordance with an embodiment, illustrating when a third OS/JVM guest has been added to the hypervisor.

FIG. 4 shows a schematic of the memory layout in accordance with an embodiment, illustrating when a third or subsequent OS/JVM guest has been added to the hypervisor. As shown in FIG. 4, the hypervisor RAM 301 contains two original guests 402 and 403. In accordance with an embodiment the Java objects 404 and 405 in these heaps are compacted to make it possible to reduce 406 their sizes, and to create a new Java heap with the newly acquired memory 407. The new Java heap 407 can then be used by the new OS/JVM guest to store Java objects 408.

Figure 5:
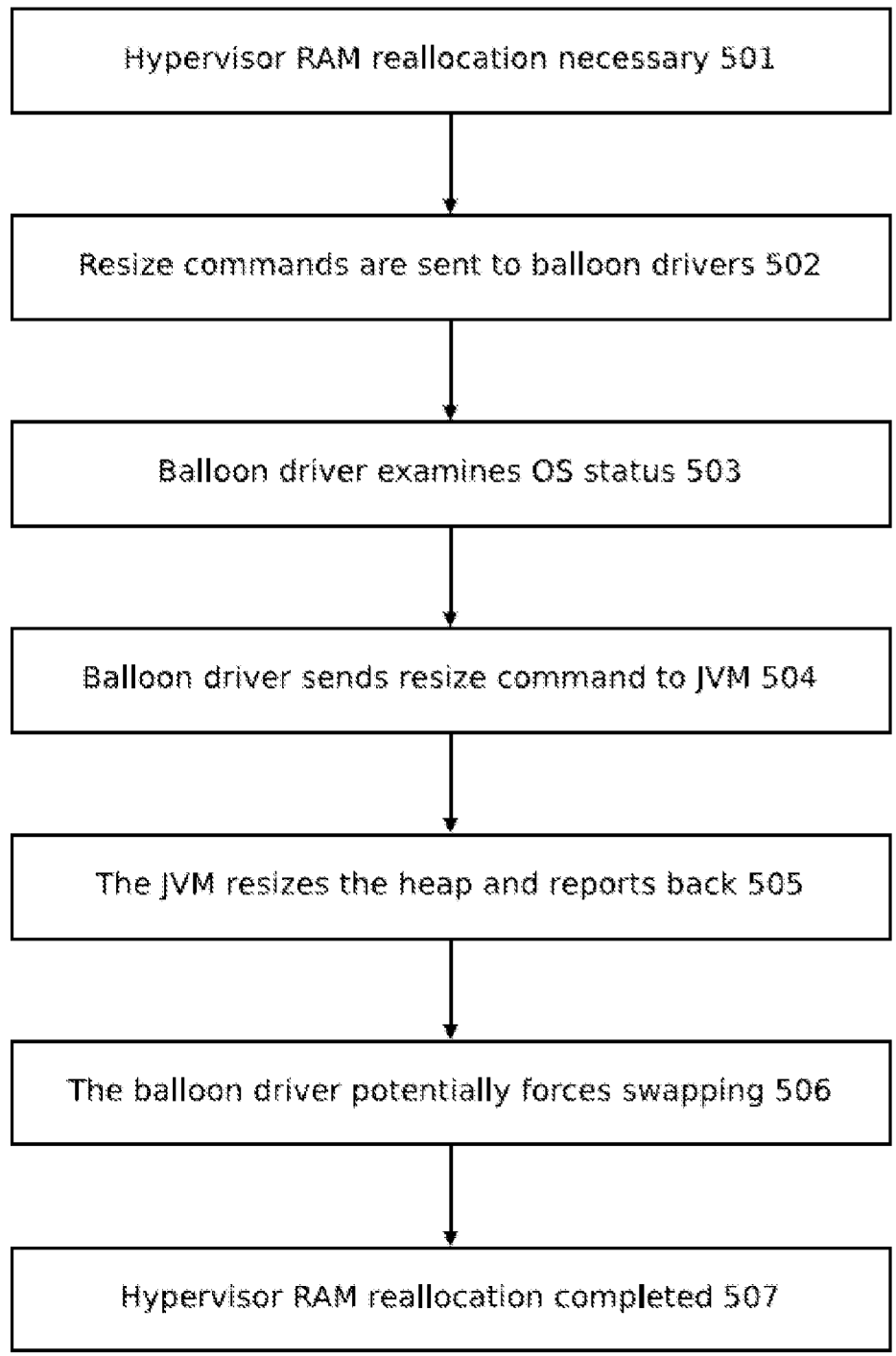
FIG. 5 shows a flowchart in accordance with an embodiment, illustrating the reallocation of hypervisor RAM.

FIG. 5 shows a flowchart in accordance with an embodiment, illustrating the reallocation of hypervisor RAM. As shown in FIG. 5, in accordance with an embodiment the process begins at block 501 when the hypervisor decides that reallocation of physical RAM is necessary. In block 502, resize commands are sent to the different guests. In block 503, the guest operating system balloon driver examines the operating system status, to determine if a JVM with a large heap is running. If this is the case, then in block 504 the balloon driver sends a resize command to the JVM. If the JVM has to reduce the size of the heap, then, in block 505, it compacts the heap using a compacting garbage collector to be able to reduce the heap size. If the JVM has to increase the size of the heap, then it can simply increase the heap size. The JVM also reports back this information. In block 506, the balloon driver examines the new status of the operating system. If the JVM resize could not be fully performed, then the balloon driver might have to inflate the balloon anyway, as a final resort. In block 507, the hypervisor memory reallocation is completed when all of the balloon drivers and JVMs have performed their memory usage reallocation and reported back.

As described above, the Java heap size is quite flexible. With a Java heap that is slightly larger than the live data, the garbage collection will be performed often, and will require a large percentage of the available CPU resources. Increasing the Java heap size will immediately lower the number of garbage collections performed, and increase system performance. Embodiments of the present invention as described above make it possible to use the flexibility of the Java heap size to accommodate the needs of several JVMs running within a single hypervisor. With this embodiment, graceful degradation can be achieved when more JVMs are added to the same server. Otherwise, the JVMs might stop working efficiently as soon as the balloon driver forces the guests to swap.

In accordance with another embodiment, the balloon driver can control the heap size of the virtual machine using the balloon driver to virtual machine communication channel.

In accordance with another embodiment, the hypervisor can divide available physical RAM evenly or in a specified proportion between the virtual machine heaps.

In accordance with another embodiment, the hypervisor can set different heap sizes for different virtual machines to guarantee conformance to service level contracts which are different for each virtual machine.

In accordance with another embodiment, the operating system can be specifically tailored to run only a single virtual machine with no swapping and no other user processes.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in a JRockit environment, other application servers, virtual machines, JVMs, computing environments, and software development systems may use and benefit from the invention. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for improved memory usage in virtual machines, comprising:
    a server including a microprocessor, and a hypervisor executing thereon;
    a virtual machine running as a guest within the hypervisor, wherein the virtual machine includes a heap for storing software objects as part of a software application executing thereon, and wherein the heap can be garbage collected; and
    a guest operating system associated with the virtual machine and including communication channels to the hypervisor and to the virtual machine, for receiving information from the hypervisor regarding a memory space of the hypervisor, and from the virtual machine regarding the heap, for use in controlling the size of the heap;
    wherein, when the hypervisor determines that a reallocation of the memory space is necessary, a resize command is sent to the guest operating system, which determines if the heap is sufficiently large, and if not sends a resize command to the virtual machine to change the size of the heap.

2. The system of claim 1, wherein the system includes a plurality of virtual machines and a plurality guest operating systems, each virtual machine associated with a guest operating system, and wherein, when the hypervisor determines that a reallocation of its memory space is necessary, a resize command is sent to each guest operating system, which determines if the heap of its associated virtual machine is sufficiently large, and if not sends a resize command to that virtual machine change the size of the heap.

3. The system of claim 2, wherein the hypervisor memory space reallocation is completed when all of the guest operating systems and virtual machines associated therewith have performed their heap size determination and reported back.

4. The system of claim 2, wherein the hypervisor can set different heap sizes for different virtual machines to guarantee conformance to service level contracts which are different for each virtual machine.

5. The system of claim 1, wherein
    if it is determined that the resize command to the virtual machine is to reduce the size of the heap, then the virtual machine compacts the heap using a compacting garbage collector; and
    if it is determined that the resize command to the virtual machine is to increase the size of the heap, then the virtual machine increases the size of the heap.

6. The system of claim 1, wherein the system includes a garbage collector for use by the virtual machine in garbage collecting of the software objects within the heap.

7. The system of claim 1, wherein the guest operating system includes a balloon driver to control the heap size of the virtual machine.

8. A method for improved memory usage in virtual machines, comprising:
    providing at a server including a microprocessor, and a hypervisor executing thereon, a virtual machine running as a guest within the hypervisor, wherein the virtual machine includes a heap for storing software objects as part of a software application executing thereon, and wherein the heap can be garbage collected; and
    providing a guest operating system associated with the virtual machine and including communication channels to the hypervisor and to the virtual machine, for receiving information from the hypervisor regarding a memory space of the hypervisor, and from the virtual machine regarding the heap, for use in controlling the size of the heap;
    wherein, when the hypervisor determines that a reallocation of the memory space is necessary, a resize command is sent to the guest operating system, which determines if the heap is sufficiently large, and if not sends a resize command to the virtual machine to change the size of the heap.

9. The method of claim 8, wherein the system includes a plurality of virtual machines and a plurality guest operating systems, each virtual machine associated with a guest operating system, and wherein, when the hypervisor determines that a reallocation of its memory space is necessary, a resize command is sent to each guest operating system, which determines if the heap of its associated virtual machine is sufficiently large, and if not sends a resize command to that virtual machine change the size of the heap.

10. The method of claim 9, wherein the hypervisor memory space reallocation is completed when all of the guest operating systems and virtual machines associated therewith have performed their heap size determination and reported back.

11. The method of claim 9, wherein the hypervisor can set different heap sizes for different virtual machines to guarantee conformance to service level contracts which are different for each virtual machine.

12. The method of claim 8, wherein
    if it is determined that the resize command to the virtual machine is to reduce the size of the heap, then the virtual machine compacts the heap using a compacting garbage collector; and if it is determined that the resize command to the virtual machine is to increase the size of the heap, then the virtual machine increases the size of the heap.

13. The method of claim 8, wherein the system includes a garbage collector for use by the virtual machine in garbage collecting of the software objects within the heap.

14. The method of claim 8, wherein the guest operating system includes a balloon driver to control the heap size of the virtual machine.

15. A non-transitory computer readable storage medium, including instructions stored thereon, which when read and executed by one or more computers, cause the one or more computers to perform the steps comprising:
- providing at a server including a microprocessor, and a hypervisor executing thereon, a virtual machine running as a guest within the hypervisor, wherein the virtual machine includes a heap for storing software objects as part of a software application executing thereon, and wherein the heap can be garbage collected; and
- providing a guest operating system associated with the virtual machine and including communication channels to the hypervisor and to the virtual machine, for receiving information from the hypervisor regarding a memory space of the hypervisor, and from the virtual machine regarding the heap, for use in controlling the size of the heap;
- wherein, when the hypervisor determines that a reallocation of the memory space is necessary, a resize command is sent to the guest operating system, which determines if the heap is sufficiently large, and if not sends a resize command to the virtual machine to change the size of the heap.

16. The non-transitory computer readable storage medium of claim 15, wherein the system includes a plurality of virtual machines and a plurality guest operating systems, each virtual machine associated with a guest operating system, and wherein, when the hypervisor determines that a reallocation of its memory space is necessary, a resize command is sent to each guest operating system, which determines if the heap of its associated virtual machine is sufficiently large, and if not sends a resize command to that virtual machine change the size of the heap.

17. The non-transitory computer readable storage medium of claim 16, wherein the hypervisor memory space reallocation is completed when all of the guest operating systems and virtual machines associated therewith have performed their heap size determination and reported back.

18. The non-transitory computer readable storage medium of claim 16, wherein the hypervisor can set different heap sizes for different virtual machines to guarantee conformance to service level contracts which are different for each virtual machine.

19. The non-transitory computer readable storage medium of claim 15, wherein
- if it is determined that the resize command to the virtual machine is to reduce the size of the heap, then the virtual machine compacts the heap using a compacting garbage collector; and
- if it is determined that the resize command to the virtual machine is to increase the size of the heap, then the virtual machine increases the size of the heap.

20. The non-transitory computer readable storage medium of claim 15, wherein the system includes a garbage collector for use by the virtual machine in garbage collecting of the software objects within the heap.

* * * * *

UNITED STATES PATENT AND TRADEMARK OFFICE
CERTIFICATE OF CORRECTION

| | | |
|---|---|---|
| PATENT NO. | : 8,959,512 B2 | Page 1 of 1 |
| APPLICATION NO. | : 13/432266 | |
| DATED | : February 17, 2015 | |
| INVENTOR(S) | : Dahlstedt | |

It is certified that error appears in the above-identified patent and that said Letters Patent is hereby corrected as shown below:

In the specification

Column 1, line 16, before "which" delete "each of".

Signed and Sealed this
Twenty-fourth Day of November, 2015

Michelle K. Lee
*Director of the United States Patent and Trademark Office*